US012646133B2

(12) United States Patent (10) Patent No.: US 12,646,133 B2
Ueda et al. (45) Date of Patent: Jun. 2, 2026

(54) VIDEO DATA PROCESSING DEVICE AND VIDEO DATA PROCESSING METHOD

(71) Applicant: Renesas Electronics Corporation, Tokyo (JP)

(72) Inventors: Hiroshi Ueda, Tokyo (JP); Ryoji Hashimoto, Tokyo (JP); Kaito Mori, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 157 days.

(21) Appl. No.: 18/589,997

(22) Filed: Feb. 28, 2024

(65) Prior Publication Data

US 2024/0331080 A1 Oct. 3, 2024

(30) Foreign Application Priority Data

Mar. 30, 2023 (JP) ................................ 2023-054746

(51) Int. Cl.
*G06T 1/20* (2006.01)
(52) U.S. Cl.
CPC ..................................... *G06T 1/20* (2013.01)
(58) Field of Classification Search
CPC ...................................................... G06T 1/20
See application file for complete search history.

(56) References Cited

U.S. PATENT DOCUMENTS

| | | | | |
|---|---|---|---|---|
| 2012/0263233 A1* | 10/2012 | Iwata | ................... | H04N 19/176 |
| | | | | 375/E7.243 |
| 2016/0100191 A1* | 4/2016 | Mishra | ................. | H04N 19/119 |
| | | | | 375/240.12 |
| 2017/0013269 A1* | 1/2017 | Kim | ..................... | H04N 19/174 |
| 2017/0180730 A1* | 6/2017 | Yatabe | ................... | H04N 19/61 |
| 2022/0197812 A1* | 6/2022 | Fruchter | .............. | G06F 3/0656 |

FOREIGN PATENT DOCUMENTS

JP        2008-271127 A      11/2008

* cited by examiner

*Primary Examiner* — Kee M Tung
*Assistant Examiner* — Khoa Vu
(74) *Attorney, Agent, or Firm* — Rimon P.C.

(57) ABSTRACT

The video data processing device includes at least one first functional module that performs first processing preset for each first processing unit data, at least one second functional module that performs second processing preset for each second processing unit data smaller than the first processing unit data, and a control unit that controls the execution order of pipeline processing for the first processing unit data by controlling the timing at which the first function module and the second function module operate. The control unit controls the subsequent stage so that the first function module and the second module are started in response to the completion of the respective processing in accordance with the end of the pre-stage.

7 Claims, 13 Drawing Sheets

DATA FOR FILTER PROCESS

IMAGE DATA TO BE PROCESSED

PROCESSING FOR 1st DEVIDED BLOCK

PROCESSING FOR 2nd DEVIDED BLOCK

PROCESSING FOR 3rd DEVIDED BLOCK

PROCESSING FOR 4th DEVIDED BLOCK

*FIG. 6*

| SHIFTER (5 BITS) | COUNTER CYCLE COUNT 1 TO 3 | START PULSE |
|---|---|---|
| bit0=1 | COUNT VALUE = 0 | VLC_Start_Pulse=ON |
| bit1=1 | COUNT VALUE = 0 TO 3 | PBC_st0_Start_Pulse=ON |
| bit1=1 | COUNT VALUE = 1 TO 3 | PBC_st1_Start_Pulse=ON |
| bit2=1 | COUNT VALUE = 0 | |
| bit1=1 | COUNT VALUE = 2 TO 3 | MC_Start_Pulse=ON |
| bit2=1 | COUNT VALUE = 0 TO 1 | |
| bit2=1 | COUNT VALUE = 2 | TRF_Start_Pulse=ON |
| bit3=1 | COUNT VALUE = 2 TO 3 | DEB_st0_Start_Pulse=ON |
| bit4=1 | COUNT VALUE = 0 TO 1 | |
| bit3=1 | COUNT VALUE = 3 | DEB_st1_Start_Pulse=ON |
| bit4=1 | COUNT VALUE = 0 TO 2 | |

| SHIFTER (5 BITS) | COUNTER CYCLE COUNT 1 TO 3 | START PULSE |
|---|---|---|
| bit0=1 | COUNT VALUE = 0 | VLC_Start_Pulse=ON |
| bit1=1 | COUNT VALUE = 0 | VLCP_st0_Start_Pulse=ON |
| bit2=1 | COUNT VALUE = 0 | VLCP_st1_Start_Pulse=ON |
| bit1=1 | COUNT VALUE = 0 TO 3 | PBC_st0_Start_Pulse=ON |
| bit1=1 | COUNT VALUE = 1 TO 3 | PBC_st1_Start_Pulse=ON |
| bit2=1 | COUNT VALUE = 0 | |
| bit1=1 | COUNT VALUE = 2 TO 3 | MC_Start_Pulse=ON |
| bit2=1 | COUNT VALUE = 0 TO 1 | |
| bit2=1 | COUNT VALUE = 2 | TRF_Start_Pulse=ON |
| bit3=1 | COUNT VALUE = 2 TO 3 | DEB_st0_Start_Pulse=ON |
| bit4=1 | COUNT VALUE = 0 TO 1 | |
| bit3=1 | COUNT VALUE = 3 | DEB_st1_Start_Pulse=ON |
| bit4=1 | COUNT VALUE = 0 TO 2 | |

FIG. 13

VIDEO DATA PROCESSING DEVICE AND VIDEO DATA PROCESSING METHOD

CROSS-REFERENCE TO RELATED APPLICATIONS

The disclosure of Japanese Patent Application No. 2023-054746 filed on Mar. 30, 2023, including the specification, drawings and abstract is incorporated herein by reference in its entirety.

BACKGROUND

The present invention relates to a video data processing device and a video data processing method, and, for example, to a video data processing device and a video data processing method for performing processing of video data by pipeline processing.

Recently, in the video processing, the capacity of data that must be processed within a predetermined period with the progress of high resolution and high frame rate of the video to be displayed is increasing. For this reason, in processors that process video data, the processing capability of video data is enhanced by constructing a pipeline with a plurality of processing blocks necessary for processing the video data and performing pipeline processing on the video data.

There is disclosed technique listed below.

[Patent Document 1] Japanese Unexamined Patent Application Publication No. 2008-271127

An example of an encoding device included in the processor for performing pipeline processing is disclosed in Patent Document 1.

The encoding device disclosed in Patent Document 1 divides the input data into a plurality of blocks and processes them for each block. For this reason, the block selection unit includes a block processing unit that generates reconstructed data based on the intra prediction signal generated by performing the intra prediction of one block according to the input data and the prediction mode, and a block selection unit that selects the block so that the block selection unit performs pipeline processing, and the block selection unit selects the next block after the timing at which the processing of the previous block ends, according to the processing order determined based on the inter-block dependency relationship indicating the relationship between one block and the block to be referred to when processing the one block.

SUMMARY

However, in recent video data processing, the circuit scale of each processing block is increasing for processing capacity improvement, a problem that the circuit area becomes large has become tangible.

Other objects and novel features will become apparent from the description of this specification and the accompanying drawings.

The video data processing device and the video data processing method according to an embodiment includes: at least one first functional module that performs first processing preset for each first processing unit data; at least one second functional module that performs second processing preset for each second processing unit data smaller than the first processing unit data; and a control unit that controls the execution order of pipeline processing for the first processing unit data by controlling the timing at which the first function module and the second function module operate, wherein the control unit controls the subsequent stage so that the first function module and the second function module are started in response to completion of each processing of the previous stage.

In the video data processing device and the video data processing method according to an embodiment, since the processing unit of the second functional module can be made smaller than the first processing unit data, the circuit scale can be reduced.

BRIEF DESCRIPTION OF THE DRAWINGS

FIG. 3 is a block diagram of a video data processing device according to the first embodiment.

FIG. 6 is a diagram illustrating the operation of the start signal generating unit according to the first embodiment.

FIG. 7 is a timing chart for explaining the operation of the video data processing device according to the first embodiment.

FIG. 12 is a diagram for explaining the operation of the start signal generating unit according to the second embodiment.

FIG. 13 is a timing chart for explaining the operation of the video data processing device according to the second embodiment.

DETAILED DESCRIPTION

Figure 1:
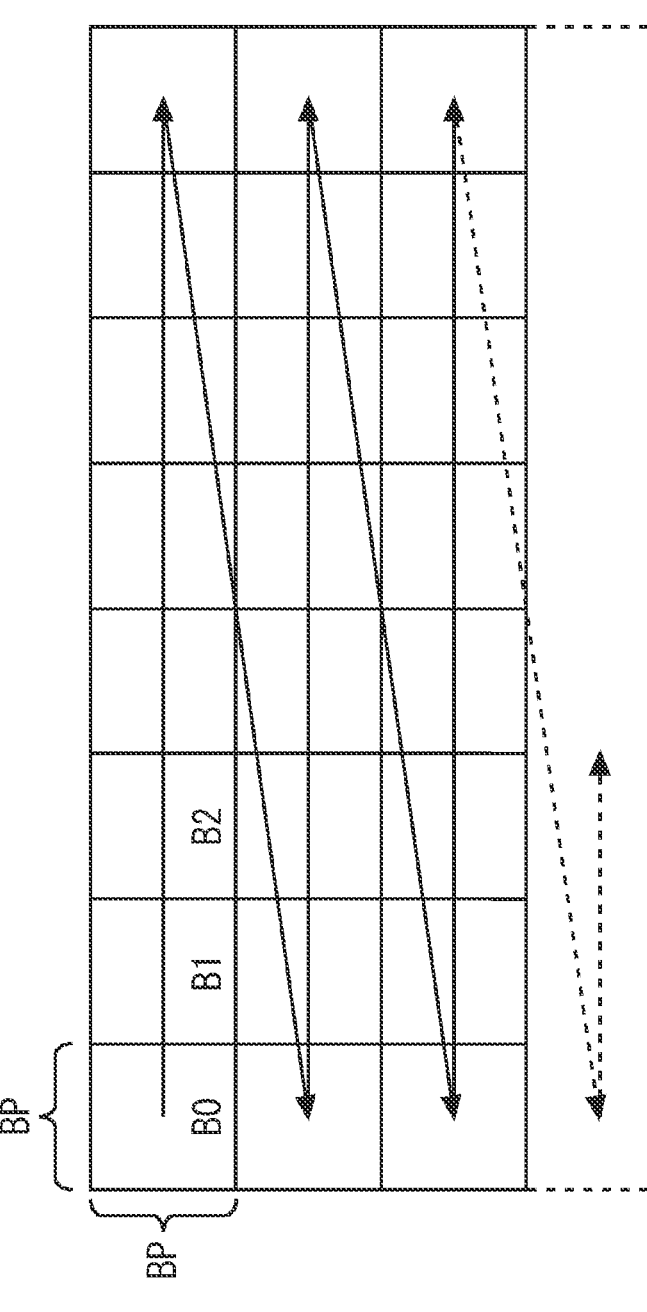
FIG. 1 is a diagram illustrating the relationship between the processing order and the processing unit data of the video data of one screen of the video data processing device.

For clarity of explanation, the following description and drawings are appropriately omitted and simplified. Further, in the drawings, the same elements are denoted by the same reference numerals, and redundant description is omitted if necessary.

FIRST EMBODIMENT

First, an outline of the image processing in the video data processing device will be described. FIG. 1 is a diagram illustrating the relationship between the processing order and the processing unit data of the video data for one screen in the video data processing device. As shown in FIG. 1, in the video data processing device described below, one screen of the video is divided into a rectangular-shaped screen area in which the number of pixels in the vertical direction and the number of pixels in the horizontal direction are BP to each other, and each of the partitioned areas is defined as a processing unit data B0 to Bm (m is an integral number), and processing is performed for each processing unit data B0 to Bm.

Figure 2:
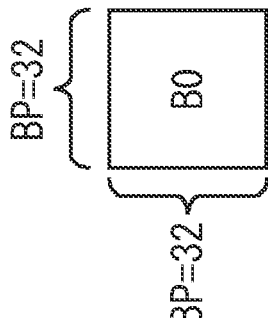
FIG. 2 is a diagram for explaining the size of the processing unit data in the video data processing device.

The video data processing device described below performs the encoding and decoding processing of the video data. Here, the video process unit of the data differs according to the CODEC standard. FIG. 2 is a diagram illustrating the size of the processing unit data in the video data processing device. In the example shown in FIG. 2, the size of the largest process unit data in AV1 (AOMedia Video 1) standard and HEVC (High Efficiency Video Coding) standard is shown. As shown in FIG. 2, in HEVC standard, the largest data processing unit becomes s image data of a rectangular shape of 32 pixels by 32 pixels, and in AV1 standard, the largest data processing unit becomes image data of a rectangular shape of 64 pixels by 64 pixels. Depending on CODEC standard, there may be a 4 times difference between a single unit of data.

Since the video data processing device requires more processing corresponding to more CODEC, it is required to prepare the hardware according to the standard with the largest processing unit. However, when hardware is simply prepared according to the standard in which the processing unit is the largest, a problem arises in which the circuit scale becomes large. Therefore, in the video data processing device described below, in the functional module capable of dividing the data among the processing for the video data, by implementing only hardware corresponding to the processing of the processing unit data smaller than the maximum processing unit, the circuit size smaller than that assumed from the standard of the corresponding CODEC is realized.

The video data processing device described below has at least one of a first functional module and a second functional module according to the size of the processable data. The first functional module performs the first processing that is preset for each first processing unit data in which one screen of the video is divided by a rectangular shape having a preset size. The first functional module is, for example, hardware capable of batch processing unit data of the largest size in AV1 standard.

The second functional module performs the second processing that is preset for each second processing unit data divided by a rectangular shape having an area smaller than the first processing unit data. The second functional module is, for example, hardware capable of batch processing unit data of the largest size in HEVC standard.

Further, the video data processing device configures a pipeline using the first functional module and the second functional module, and performs pipeline processing for the first processing unit data in the pipeline by controlling the timing at which the first functional module and the second functional module operate by the control unit. In the following explanation, the video data processing unit corresponding to AV1 standard and HEVC standard will be described, but the disclosure is not limited thereto.

Figure 3:
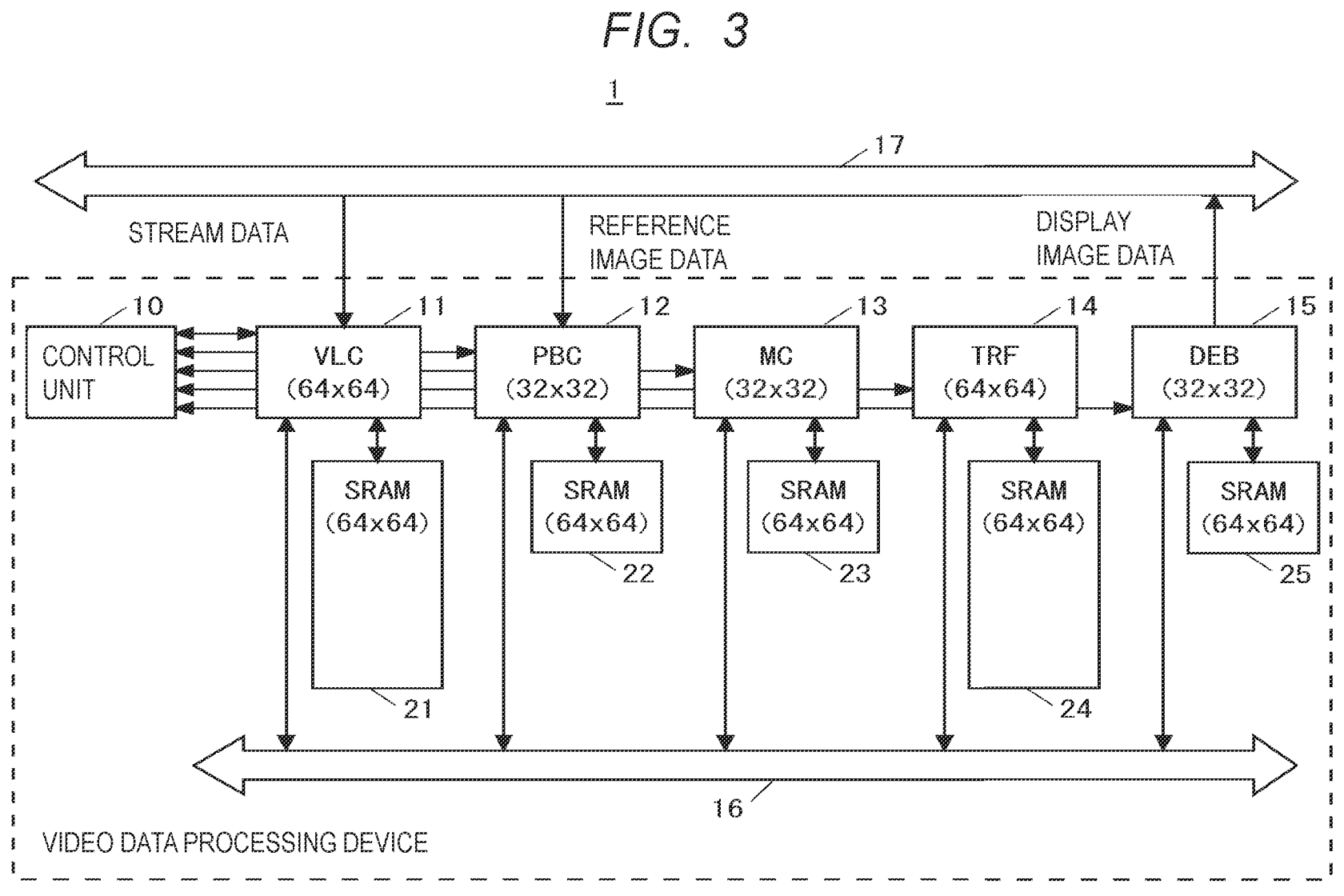

FIG. 3 shows a block diagram of the video data processing device 1 according to the first embodiment. In FIG. 3, an external bus 17 serving as an input/output destination of data of the video data processing device 1 is shown. As shown in FIG. 3, the video data processing device 1 according to the first embodiment includes a control unit 10, a variable-length encoding/decoding processing unit (VLC) 11, a picture buffer controller (PBC) 12, a motion compensation processing unit (MC) 13, a conversion/quantization processing unit (TRF) 14, a deblocking filter processing unit (DEB) 15, an internal bus 16, and image processing buffers 21 to 25.

In the video data processing device 1 according to the first embodiment, the variable-length encoding/decoding processing unit (VLC) 11 and the conversion/quantization processing unit (TRF) 14 are used as the first functional module, and the picture buffer controller (PBC) 12, the motion compensation processing unit (MC) 13, and the deblocking filter processing unit (DEB) 15 are used as the second functional module whose processing unit data size is smaller than that of the first functional module.

The variable-length encoding/decoding processing unit (VLC) 11 is a function module, also called a Variable Length Coding, and performs the following processing as a preset first processing. That is, in the encoding process, the variable-length encoding/decoding unit (VLC) 11 assigns the reference numeral of the bit stream according to the parameter given from the internal bus 16 and outputs the code to the external bus 17. In addition, the variable-length encoding/decoding processing unit (VLC) 11 includes a variable-length decoding parameter generation function for performing code analysis of the bit stream given from the external bus 17 in the decoding process and outputting the resulting parameter to the internal bus 16.

Then, the variable-length encoding/decoding processing unit (VLC) 11 uses a first image processing buffer (for example, the image processing buffer 21) per performing the given first processing. The image processing buffer 21 has a capacity capable of processing the first processing unit data. In other words, in the video data processing device 1, the variable-length encoding/decoding processing unit (VLC) 11 and the image processing buffer 21 are combined to form one first functional module.

The picture buffer controller (PBC) 12 is a functional module and performs the following processing as a second processing preset. That is, the picture buffer controller (PBC) 12 reads at least a reference image from the external bus 17 and outputs it to the internal bus 16. Then, the picture buffer controller (PBC) 12 uses a second image processing buffer (for example, the image processing buffer 22) in performing the given second processing. The image processing buffer 22 has a capacity capable of processing the second processing unit data. That is, in the video data processing device 1, the picture buffer controller (PBC) 12 and the image processing buffer 22 are combined to form one second functional module.

The motion compensation processing unit (MC) 13 is a function module and performs the following processing as a preset second processing. The motion compensation processing unit (MC) 13 predicts the motion of the video based on the parameter given from the internal bus 16 and the reference image. Then, the motion compensation processing unit (MC) 13 uses a second image processing buffer (for example, the image processing buffer 23) in performing the given second processing. The image processing buffer 23 has a capacity capable of processing the second processing unit data. In other words, in the video data processing device 1, the motion compensation processing unit (MC) 13 and the image processing buffer 23 are combined to form one second functional module.

The conversion/quantization processing unit (TRF) 14 is a function module and performs the following processing as a preset first processing. That is, the conversion/quantization processing unit (TRF) 14 performs conversion/quantization processing of image data given from the internal bus 16. Then, the conversion/quantization processing unit (TRF) 14 uses a first image processing buffer (for example, the image processing buffer 24) for performing the given first processing. The image processing buffer 24 has a capacity capable of processing the first processing unit data. In other words, in the video data processing device 1, the conversion/ quantization processing unit (TRF) 14 and the image processing buffer 24 are combined to form one first functional module.

The deblocking filter processing unit (DEB) 15 is a function module and performs the following processing as a preset second processing. That is, the deblocking filter processing unit (DEB) performs a filtering process for reducing the blocking noise on the image data given from the internal bus 16 and outputs it to the external bus 17. Then, the deblocking filter processing unit (DEB) 15 uses a second image processing buffer (for example, the image processing buffer 25) in performing the given second processing. The image processing buffer 25 has a capacity capable of processing the second processing unit data. In other words, in the video data processing device 1, the deblocking filter processing unit (DEB) 15 and the image processing buffer 25 are combined to form one second functional module.

Here, in the video data processing device 1 according to the first embodiment, the first functional module and the second functional module for processing the processing unit data having different data sizes are mixed. Here, when the video data processing device 1 is made to correspond to AV1 standard and HEVC standard, the processing unit data (64 pixels×64 pixels) which is the maximum in AV1 standard is given to the first functional module, the second functional module is provided with a processing capacity corresponding to the processing unit data (32 pixels×32 pixels) which is the maximum in HEVC standard.

Here, there is a difference of four times in the maximum value of processing unit data between AV1 standard and HEVC standard. Therefore, in the video data processing device 1 according to the first embodiment, the first unit-processed data corresponding to the largest value of AV1 standard is divided into four and processed by the second functional module. That is, in the video data processing device 1 according to the first embodiment, four minutes of the second processing unit data in the second function module while processing one first processing unit data in the first function module.

Figure 4:
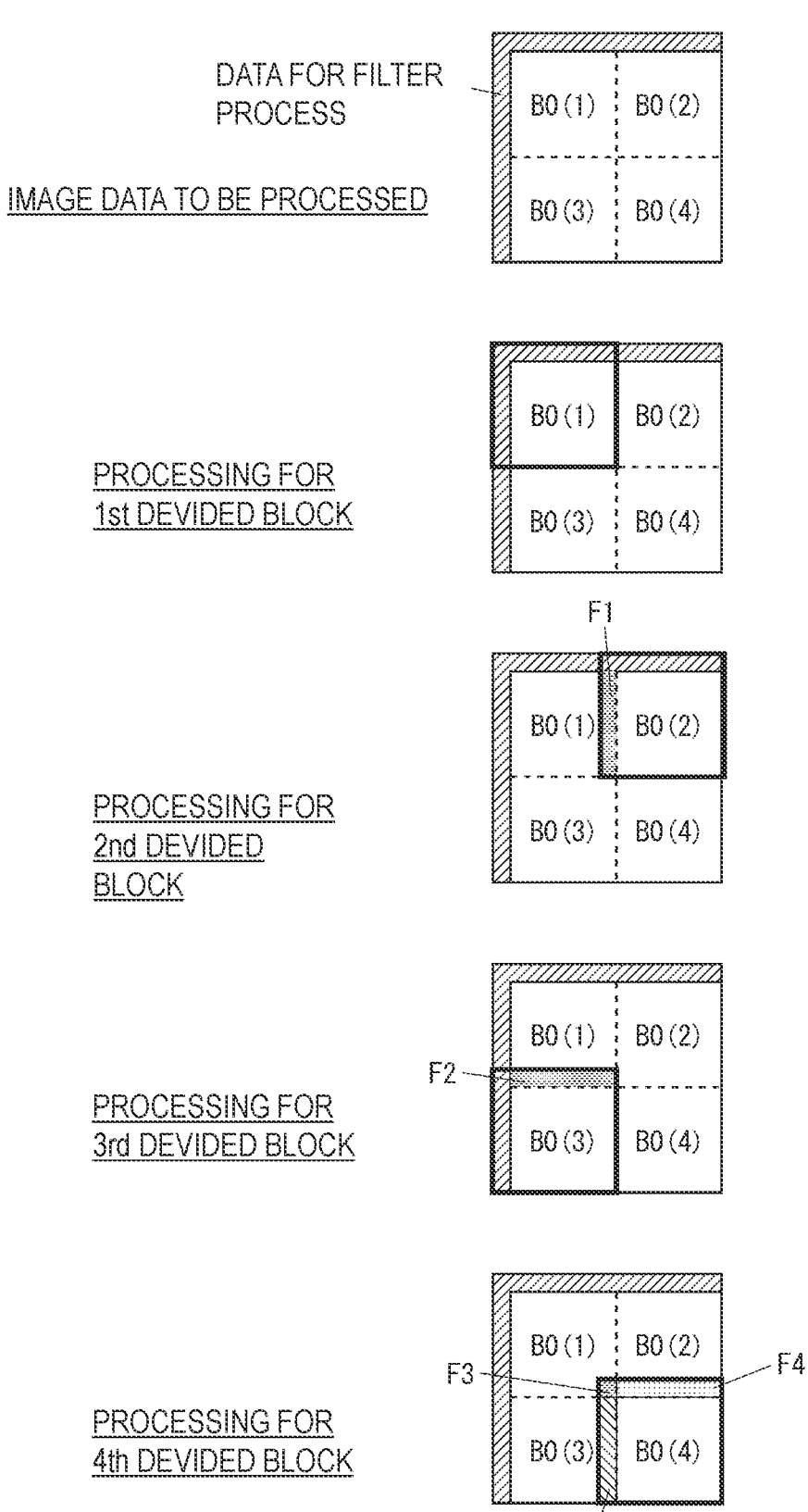
FIG. 4 is a diagram for explaining a video data processing method in the second functional module of the video data processing device according to the first embodiment.

FIG. 4 shows a diagram illustrating a data processing method in the second functional module of the video data processing device according to the first embodiment. In the exemplary embodiment shown in FIG. 4, the first processing unit data B0 can be divided into second processing unit data B0 (1) to B0 (4), as shown in FIG. 4, which is the processing in the deblocking filter processing unit (DEB) 15.

Further, the deblocking filter processing unit (DEB) 15 uses the pixels of the predetermined area along the upper and left sides of the first processing unit data B0 for filtering. Then, the deblocking filter processing unit (DEB) 15 performs filter processing for the second unit processing data B0 (1) serving as the first divided block by using the filter processing data in contact with the second unit processing data B0 (1).

Subsequently, after performing the filtering process for the region of the second unit processing data B0 (1), the deblocking filter processing unit (DEB) 15 performs the filtering process for the second unit processing data B0 (2) serving as the second divided block by using the filter processing data in contact with the second unit processing data B0 (2). In the filter processing for the second unit processing data B0 (2), since the data in contact with the left side of the second unit processing data B0 (2) becomes the second unit processing data B0 (1), the left side of the filter using the data F1 included in the second unit processing data B0 (1) as the data.

Subsequently, after performing filtering processing for the area of the second unit processing data B0 (2), the deblocking filter processing unit (DEB) 15 performs filtering processing for the second unit processing data B0 (3) serving as the third divided block by using the filter processing data in contact with the second unit processing data B0 (3). In the filter processing for the second unit processing data B0 (3), since the data in contact with the upper side of the second unit processing data B0 (3) becomes the second unit processing data B0 (1), the second unit processing data as upper side filter processing data using the data F2 included in B0 (1).

Subsequently, after performing the filtering process for the region of the second unit processing data B0 (3), the deblocking filter processing unit (DEB) 15 performs the filtering process for the second unit processing data B0 (4) serving as the fourth divided block using the filtering data in contact with the second unit processing data B0 (4). In the filtering for the second unit processing data B0 (4), since there is no data in contact with the upper and left sides of the second unit processing data B0 (4), the second unit processing data in contact with the second unit processing data B0 (4) as filter processing data using the other second unit processing data. In FIG. 4, the second processing unit data B0 (1) to B0 (3) used as data for filtering in the filtering of the second unit processing data B0 (4) were signed with F3 to F5.

As described above, in the video data processing device 1 according to the first embodiment, four pieces of second processing target data are processed in the second function module in a period in which the first function module can complete processing for one first processing target data. Thus, by operating the first functional module and the second functional module in cycles of different lengths, the storage capacity to be set in the image processing buffer included in the second functional module can be made smaller than the image processing buffer included in the first functional module. Then, in the video data processing device 1 according to the first embodiment, the capacity of the image processing buffer included in the second functional module is suppressed, thereby realizing the reduction of the circuit scale.

Here, in the video data processing device 1 according to the first embodiment, pipeline processing is realized by controlling the timing at which the variable-length encoding/ decoding processing unit (VLC) 11, the picture buffer controller (PBC) 12, the motion compensation processing unit (MC) 13, the conversion/quantization processing unit (TRF) 14, and the deblocking filter processing unit (DEB) 15 start operation by the control unit 10. Therefore, the control unit 10 will be described below.

The control unit 10 controls the operation start timing of each function module described above. Specifically, the control unit 10 instructs the start of the operation in response to completion of the processing for one first processing unit data in the first function module of the previous stage for the second function module in which the first function module is arranged in the previous stage on the pipeline. The control unit 10 instructs the start of the operation in response to completion of the processing for one second processing unit data in the second functional module of the previous stage for the second functional module in which the second functional module is disposed in the previous stage on the pipeline.

The control unit 10 instructs the start of the operation in response to completion of the processing for one first processing unit data in the first function module of the previous stage for the first function module in which the first function module is arranged in the previous stage on the pipeline. The control unit 10 instructs the start of the operation in response to completion of the processing for the second processing unit data corresponding to the data amount of the first processing unit data in the second functional module of the previous stage for the first functional module in which the second functional module is disposed in the previous stage on the pipeline.

Figure 5:
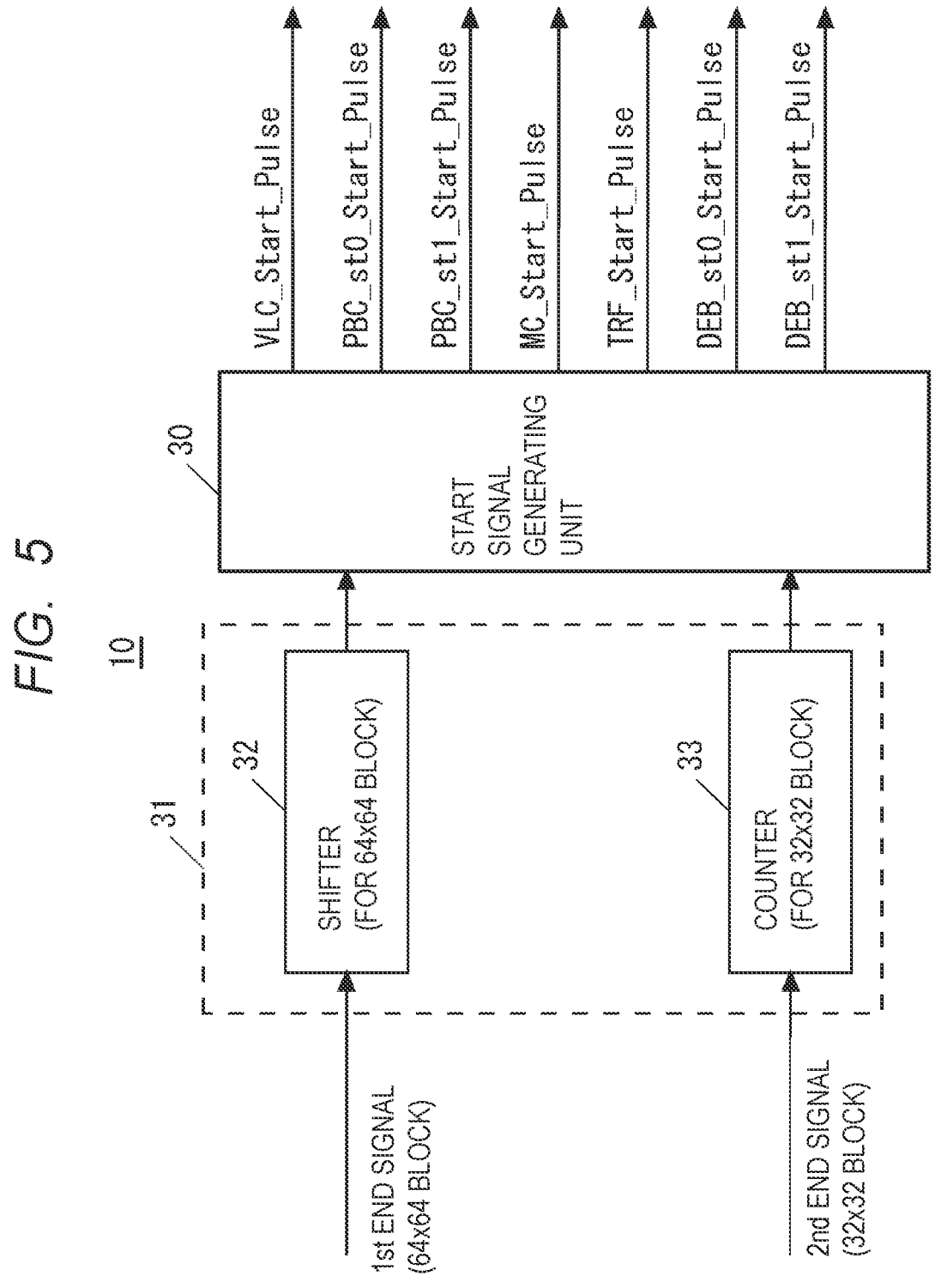
FIG. 5 is a block diagram of a control unit of the video data processing device according to the first embodiment.

Here, it shows a block diagram of the control unit 10 of the video data processing device 1 according to the first embodiment in FIG. 5. The control unit 10 configuration shown in FIG. 5 is an example of realizing the control unit 10, the configuration for implementing the operation of the control unit 10 described above is not limited thereto.

In the example shown in FIG. 5, the control unit 10 includes a start signal generating unit 30 and a state transition machine 31. The state transition machine 31 receives the first end signal from the block for processing the first processing unit data of 64 pixels×64 pixels such as variable-length encoding/decoding processing unit (VLC) 11 and the conversion/quantization processing unit (TRF) 14, and the second end signal from the block for processing the second unit processing data of 32 pixels×32 pixels such as the picture buffer controller (PBC) 12, the motion compensation processing unit (MC) 13, and the deblocking filter processing unit (DEB) 15. Then, the state transition machine 31 changes the output value in accordance with the combination of the received first end signal and the second end signal. In the example shown in FIG. 5, the state transition machine 31 has a shifter 32 and a counter 33.

The shifter 32 transits the 0th bit to "1" when the first processing unit data is input to the variable-length encoding/decoding processing unit (VLC) 11, and shifts the value "1" to the higher-order bit side by one bit each time the first end signal is input. Then, the shifter 32, for example, outputs a value of 5 bits to shift the value as an output value. The counter 33 cyclically changes the count value between 0 to 3 each time the second end signal is input. The output value of the counter 33 is a count value. That is, the state transition machine 31 outputs a combination of the output value of the shifter 32 and the output value of the shifter 32 as one output value.

The state transition machine 31 is not limited to the combination of the shifter 32 and the counter 33, two shifters corresponding to each of the first end signal and the second end signal, or it may be provided two counters. Further, the state transition machine 31 is provided with a counter corresponding to the first end signal, may be provided a shifter corresponding to the second end signal.

When the output value of the state transition machine matches the start value defined for each function module, the start signal generating unit 30 transmits a start pulse instructing the function module whose value matches to start the operation. In the example shown in FIG. 5, the start signal generating unit 30 outputs seven start pulses.

Specifically, the first start pulse is a VLC start pulse VLC_Start_Pulse instructing the variable-length encoding/decoding processing unit (VLC) 11 to start the operation. The second start pulse is a start pulse PBC_st0_Start_Pulse for PBC stage 0 instructing the operation start of the first stage of the operation of the picture buffer controller (PBC) 12. The third start pulse is a start pulse PBC_st1_Start_Pulse for PBC stage 1 instructing the operation of the second stage of the operation of the picture buffer controller (PBC) 12.

The fourth start pulse is a MC start pulse MC_Start_Pulse for instructing the operation start to the motion compensation processor (MC) 13. The fifth start pulse is a TRF start pulse TRF_Start_Pulse for instructing the operation start to the conversion-quantization processor (TRF) 14. The sixth start pulse is a start pulse DEB_st0_Start_Pulse for DEB stage 0 instructing the operation start of the first stage of the operation of the deblocking filter processor (DEB) 15. The seventh start pulse is a DEB stage 1 start pulse DEB_st1_Start_Pulse for instructing the operation start of the second stage of the operation of the deblocking filter processor (DEB) 15.

An example of the operation of the start signal generating unit 30 will now be described. FIG. 6 shows a diagram for explaining the operation of the start signal generating unit according to the first embodiment. The example shown in FIG. 6 is for controlling a pipeline capable of operating the video data processing device 1 shown in FIG. 3 most efficiently. The start signal generating unit 30, it is assumed to hold the combination of the value of the shifter and the counter shown in FIG. 6 as a start value for each function module.

As shown in FIG. 6, when the 0th bit of the shifter 32 is 1 and the count value of the counter 33 is 0, the start signal generating unit 30 outputs VLC start pulse VLC_Start_Pulse to the variable-length encoding/decoding processing unit (VLC) 11 and causes the variable-length encoding/decoding processing unit (VLC) 11 to start processing.

The start signal generating unit 30 outputs a start pulse PBC_st0_Start_Pulse for PBC stage 0 to the picture buffer controller (PBC) 12 when the first bit of the shifter 32 is 1 and the count value of the counter 33 is 0 to 3 and causes the picture buffer controller (PBC) 12 to start the process of the first stage.

The start signal generating unit 30 outputs the start pulse PBC_st1_Start_Pulse for PBC stage 1 to the picture buffer controller (PBC) 12 when the first bit of the shifter 32 is 1 and the count value of the counter 33 is 1 to 3, and the second bit of the shifter 32 is 1 and the count value of the counter 33 is 0, and starts the process of the second stage to the picture buffer controller (PBC) 12.

The start signal generating unit 30 outputs MC start pulse MC_Start_Pulse to the motion compensation processing unit (MC) 13 when the first bit of the shifter 32 is 1 and the count value of the counter 33 is 2 to 3, and the second bit of the shifter 32 is 1 and the count value of the counter 33 is 0 to 1, thereby starting the process to the motion compensation processing unit (MC) 13.

The start signal generating unit 30 outputs TRF start pulse TRF_Start_Pulse to the conversion/quantization processing unit (TRF) 14 when the second bit of the shifter 32 is 1 and the count value of the counter 33 is 2, and starts the processing in the conversion/quantization processing unit (TRF) 14.

The start signal generating unit 30 outputs the start pulse DEB_st0_Start_Pulse for DEB stage 0 to the deblocking filter processing unit (DEB) 15 when the third bit of the shifter 32 is 1 and the count value of the counter 33 is 2 to 3, and the fourth bit of the shifter 32 is 1 and the count value of the counter 33 is 0 to 1, and starts the processing of the first stage to the deblocking filter processing unit (DEB) 15.

The start signal generating unit 30, the third bit of the shifter 32 is 1, and if the count value of the counter 33 is 3, and, the 4th bit of the shifter 32 is 1, and, when the count value of the counter 33 is 0 to 2, DEB stage 1 start pulse DEB_st1_Start_Pulse is outputted to the deblocking filter processing unit (DEB) 15 to start the processing of the second stage.

Figure 7:
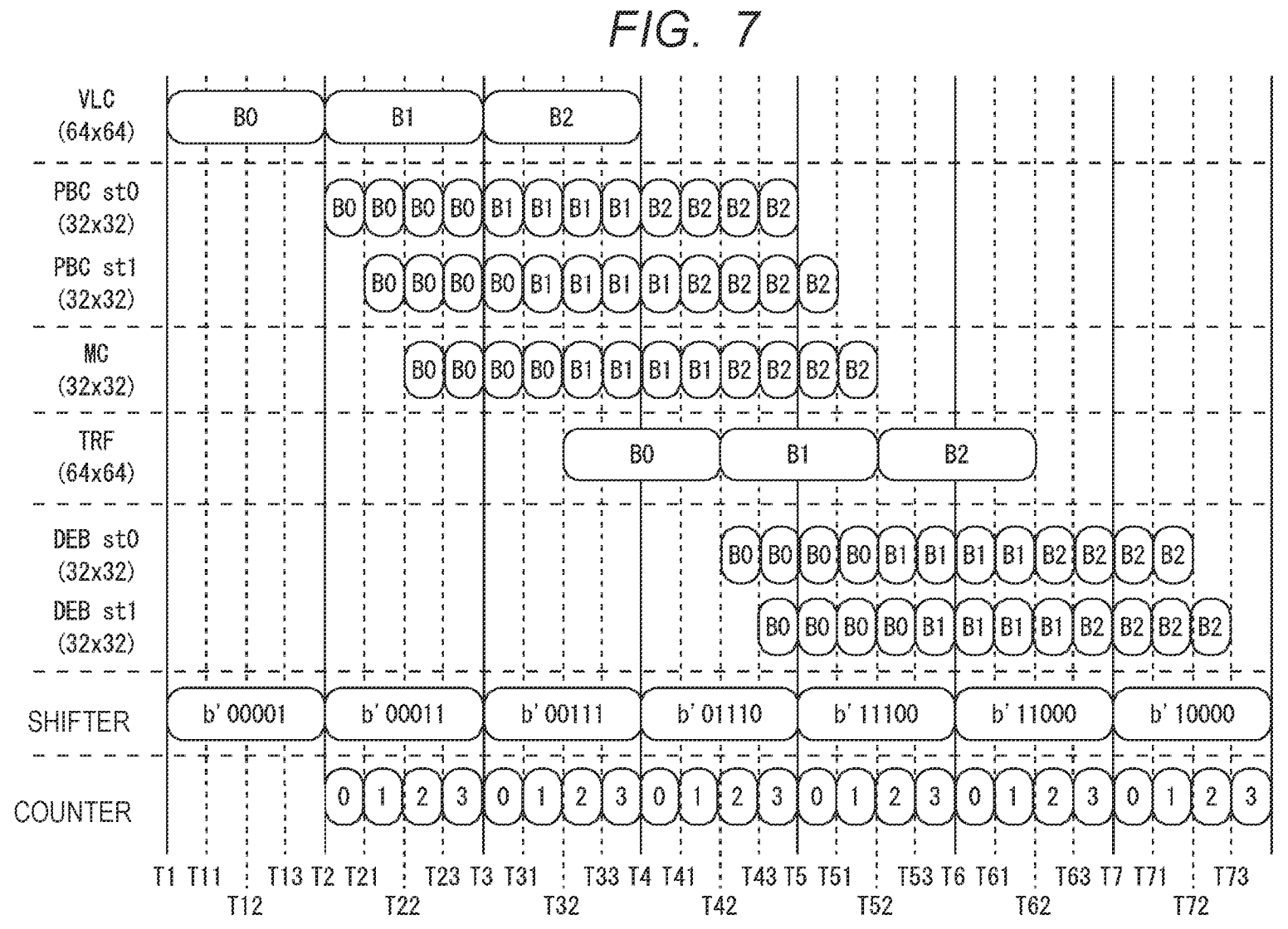

Subsequently, the operation of the video data processing device 1 according to the rule shown in FIG. 6. FIG. 7 shows a timing chart illustrating the operation of the video data processing device according to the first embodiment. Incidentally, in FIG. 7, it has been a timing chart related to three (processing unit data B0 to B2 in FIG. 7) as the processing unit data to be processed, actually processing unit data becomes three or more.

As illustrated in FIG. 7, in the video data processing device 1 according to the first embodiment, the first bit of the shifter 32 is set to the 0th bit every time new data to be processed is given to the variable-length encoding/decoding processing unit (VLC) 11 which is the first functional module. Then, in the shifter 32, the value is shifted to the higher-order bit side each time the processing of the first processing unit data is completed in the variable-length encoding/decoding processing unit (VLC) 11 and the conversion/quantization processing unit (TRF) 14 which are the first function modules.

Further, as shown in FIG. 7, in the video data processing device 1 according to the first embodiment, the count value of the counter 33 is counted up one by one every time processing for the second processing unit data obtained by dividing the processing target data in the picture buffer controller (PBC) 12, the motion compensation processing unit (MC) 13, and the deblocking filter processing unit (DEB) 15, which are the second function modules, is completed.

Then, as shown in FIG. 7, in the video data processing device 1 according to the first embodiment, the functional module in which the processing of the first functional module is arranged in the previous stage of the pipeline (the processing described on the upper side in FIG. 7) starts processing in response to completion of the processing cycle (the time interval shown by the solid line in FIG. 7) which becomes one processing unit of the first functional module arranged in the previous stage.

On the other hand, in the video data processing device 1 according to the first embodiment, the functional module in which processing of the second functional module is arranged in front of the pipeline starts processing in response to completion of a processing cycle (time interval indicated by a dotted line in FIG. 7) that becomes one processing unit of the second functional module arranged in the front stage. Further, in the example shown in FIG. 7, the operation of each function module based on the combination of the count value of the value and the counter 33 of the shifter 32 shown in FIG. 6 is started. As can be seen from FIG. 7, in the video data processing device 1 according to the first embodiment, at least two different time processing cycles are mixed in the pipeline.

From the above description, in the video data processing device 1 according to the first embodiment, by configuring the control unit 10 so as to mix the process of operating in a cycle having two different time lengths in the pipeline, a short time length it is possible to reduce the capacity of the image processing buffer included in the functional module to proceed with the process. In addition, since the size of the image processing buffers is reduced, the video data processing device 1 according to the first embodiment can process the largest processing unit data of the corresponding CODEC standard by using smaller circuit-scale hardware.

Figure 8:
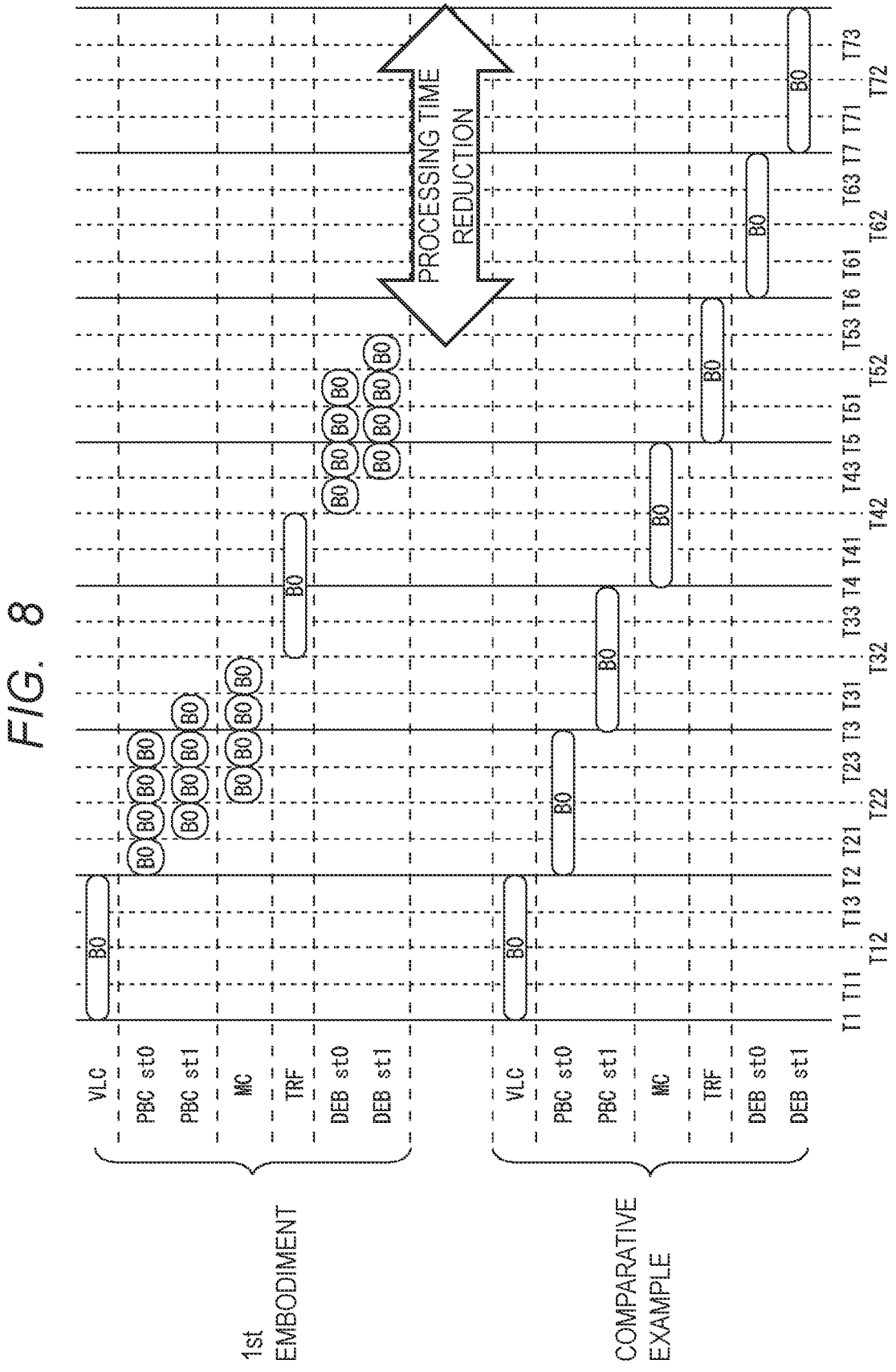
FIG. 8 is a timing chart for explaining effects related to processing time in the video data processing device according to the first embodiment.

Further, in the video data processing device 1 according to the first embodiment, it is possible to shorten the time required for pipeline processing for one processing unit data. The reduction of the processing time will be described with reference to FIG. 8. FIG. 8 is a timing chart illustrating effects related to processing time in the video data processing device according to the first embodiment. In FIG. 8, the video data processing device 1 according to the first embodiment and the video data processing device according to the comparative example are compared with each other with respect to the time from the time when one processing unit data B0 is input to the pipeline until the time when the pipeline processing is completed.

Here, in the video data processing device according to the comparative example, all the functional modules are configured to process the processing unit data of the same size. Referring to FIG. 8, it can be understood that the video data processing device 1 according to the first embodiment can reduce the time required for processing to be completed by about 30% in comparison with the video data processing device according to the comparative example. In this way, for the functional module that can be processed by the second processing unit data that divides the first processing unit data, by executing pipeline processing in hardware and cycle time corresponding to the second processing unit data, it is possible to reduce the time from pipeline input to processing completion.

SECOND EMBODIMENT

In the second embodiment, another form of the video data processing device 1 according to the first embodiment will be described. In the description of the second embodiment, for the same components as those described in the first embodiment will be omitted with the same reference numerals as in the first embodiment.

Figure 9:
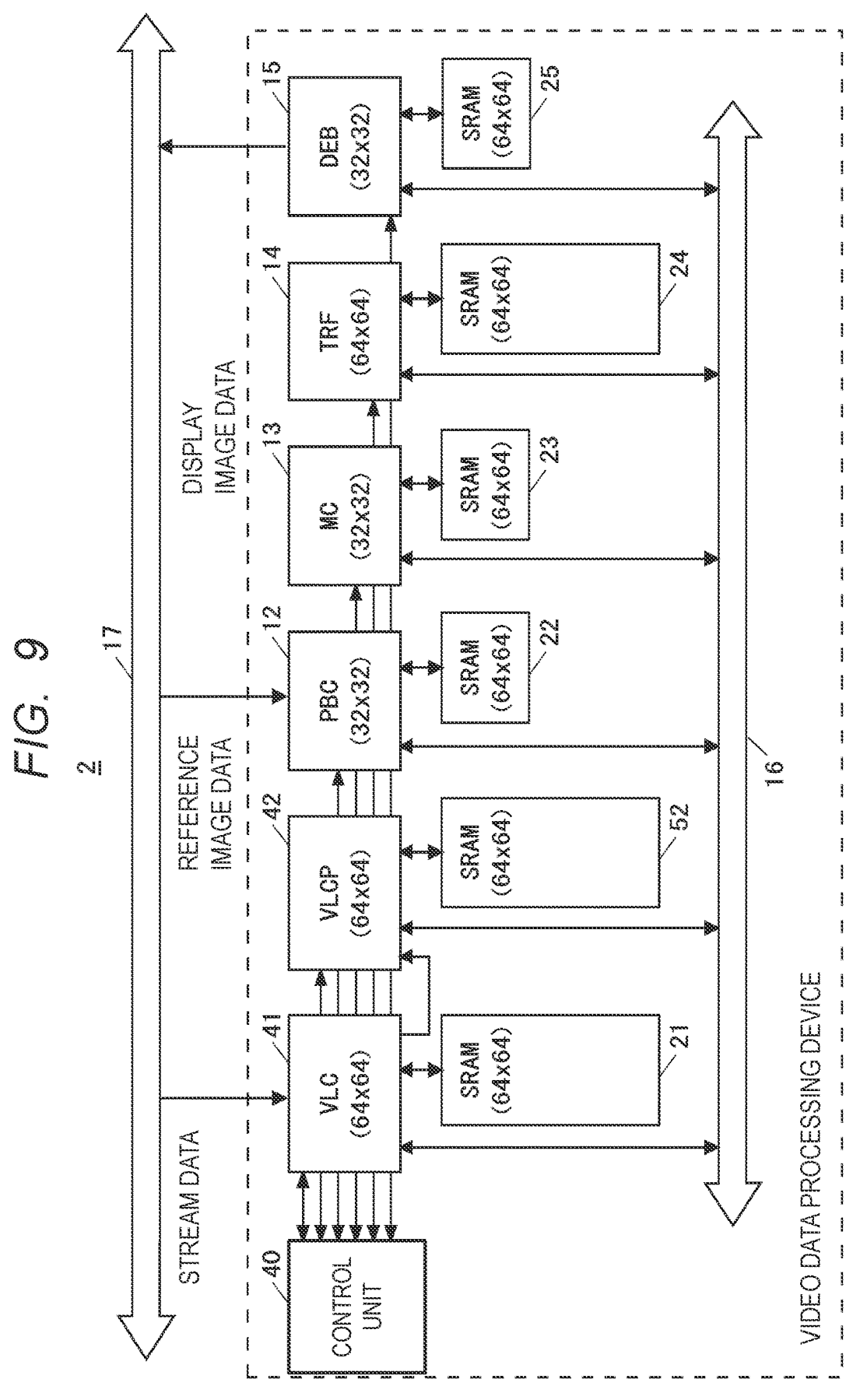
FIG. 9 is a block diagram of a video data processing device according to a second embodiment.

FIG. 9 shows a block diagram of the video data processing device according to the second embodiment. As shown in FIG. 9, in the video data processing device 2 according to the second embodiment, the variable-length decoding parameter generation processing unit (VLCP) 42 and the image processing buffer 52 are added to the video data processing device 1 according to the first embodiment. Further, in the video data processing device 2 according to the second embodiment, the control unit 10 and the variable-length encoding/decoding processing unit (VLC) 11 of the video data processing device 1 according to the first embodiment are replaced with the control unit 40 and the variable-length encoding/decoding processing unit (VLC) 41.

The variable-length decoding parameter generation processing unit (VLCP) 42 disconnects the variable-length decoding parameter generation processing function included in the variable-length encoding/decoding processing unit (VLC) 11 from the variable-length encoding/decoding processing unit (VLC) 11. In the video data processing device 2, it is necessary to analyze the reference numeral of the bit stream given from the external bus 17 at the time of decoding to generate the parameter used in the conversion/ quantization processing unit (TRF) 14.

The variable-length decoding parameter generation process is performed after the decoding process is performed on the bitstream. In other words, the decoding process and the variable-length decoding parameter generation process in the variable-length encoding/decoding processing unit (x) 11 are processes that can be processed in a different time axis.

In the second embodiment, the variable-length decoding parameter generation process is separated from the process performed in the variable-length encoding/decoding unit (VLC) 11 and processed by pipeline processing. The image processing buffer 52 provided in association with the variable-length decoding parameter generation processing unit (VLCP) 42 has a capacity capable of processing the first processing unit data in the same manner as the image processing buffer 21 because the variable-length decoding parameter generation processing unit (VLCP) 42 is a first functional module that operates as a processing unit in the first processing unit data.

The variable-length encoding/decoding processing unit (VLC) 41 excludes the function related to the variable-length decoding parameter generation process from the variable-length encoding/decoding processing unit (VLC) 11. The control unit 40 adds a function of outputting a start pulse to be transmitted to the variable-length decoding parameter generation processing unit (VLCP) 42 to the control unit 10.

Figure 10:
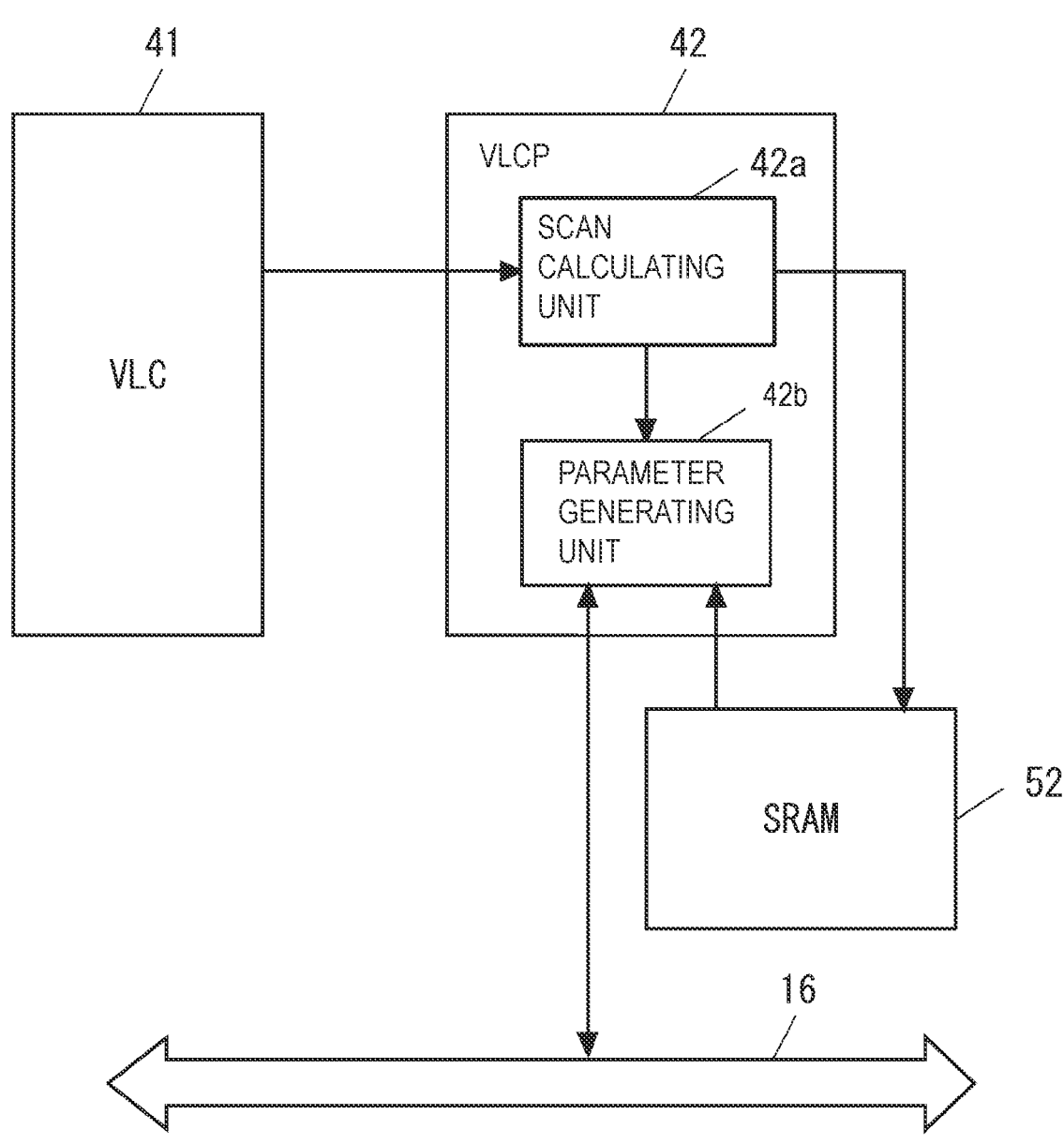
FIG. 10 is a block diagram of a variable length decoding parameter generation processing unit of the video data processing device according to the second embodiment.

Here, the variable-length decoding parameter generation processing unit (VLCP) 42 will be described in further detail. Therefore, FIG. 10 shows a block diagram of a variable-length decoding parameter generation processing unit (VLCP) 42 of the video data processing device according to the second embodiment. In FIG. 10, the variable length encoding/decoding processing unit (VLC) 41, the image processing buffer 52, and the internal bus 16 are illustrated in order to explain the function of the variable-length decoding parameter generation processing unit (VLCP) 42.

As shown in FIG. 10, the variable-length decoding parameter generation processor (VLCP) 42 has a scan calculating unit 42a and a parameter generating unit 42b. The scan calculating unit 42a performs analysis processing of the bit stream decoded by the variable-length encoding/decoding unit (VLC) 41 and stores the analysis result in the image processing buffers 52. The parameter generating unit 42b reads the analysis result from the image processing buffer 52, generates parameters to be used by the transformation/quantization processing unit (TRF) 14 based on the analysis result, and outputs the generated parameters to the internal bus 16.

Here, the function of the variable-length decoding parameter generation processing unit (VLCP) 42 is separated from the variable-length encoding/decoding processing unit (VLC) 11, so that the operation capacity of the variable-length encoding/decoding processing unit (VLC) 41 and the variable-length decoding parameter generation processing unit (VLCP) 42 can be reduced more than that of the variable-length encoding/decoding processing unit (VLC) 11, thereby reducing the circuit scale.

Further, in the second embodiment, the processing performed by the scan calculating unit 42a and the processing performed by the parameter generating unit 42b are executed in the different stages. That is, the execution stage of the variable-length decoding parameter generation processing unit (VLCP) 42 is composed of two execution stages. Since the analysis process usually performed in the scan calculating unit 42a requires time, the analysis process performed in the scan calculating unit 42a and the parameter generation process performed in the parameter generation unit 42b are required to have a higher computing capacity on the scan calculating unit 42a when the process is performed at the same time as the decoding process of the variable-length encoding decoding processing unit (VLC) 41. However, the circuit scale of the scan calculating unit 42a may be increased. However, the circuit scale of the scan calculating unit 42a can be reduced by processing the analysis process performed on the scan calculating unit 42a and the parameter generation process performed on the parameter generating unit 42b in a separate stage.

Figure 11:
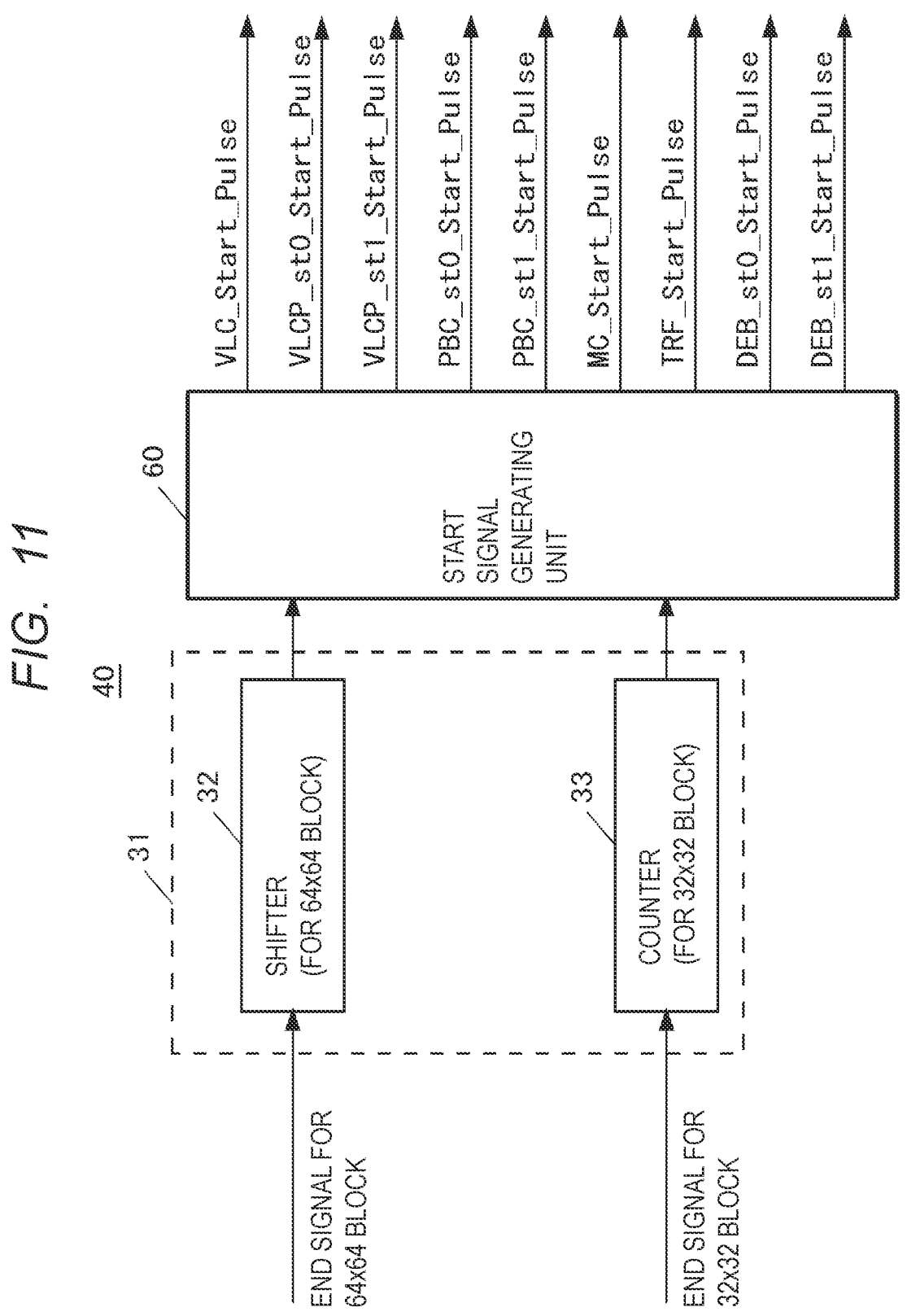
FIG. 11 is a block diagram of a control unit of the video data processing device according to the second embodiment.

Next, the control unit 40 will be described. FIG. 11 shows a block diagram of a control unit of the video data processing device according to the second embodiment. As shown in FIG. 11, the control unit 40 has a start signal generator 60 in place of the start signal generating unit 30 of the control unit 10 of the first embodiment. Start signal generator 60 is obtained by adding a function of outputting a VLCP stage 0 for start pulse VLCP_st0_Start_Pulse and VLCP stage 1 for start pulse VLCP_st1_Start_Pulse to the start signal generating unit 30.

The start pulse VLCP_st0_Start_Pulse for VLCP stage 0 instructs the variable-length decoding parameter generation processing unit (VLCP) 42 to start the processing of the first stage. The start pulse VLCP_st1_Start_Pulse for VLCP stage 1 instructs the variable-length decoding parameter generation processing unit (VLCP) 42 to start the processing of the second stage.

Here, the operation of the start signal generator 60. Therefore, FIG. 12 shows a diagram for explaining the operation of the start signal generator according to the second embodiment. As shown in FIG. 12, in the operation of the start signal generator 60, the start value of VLCP stage 0 for start pulse VLCP_st0_Start_Pulse and VLCP stage 1 for the operation of the start signal generating unit 30 start pulse VLCP_st1_Start_Pulse is added.

The start signal generating unit 60, the first bit of the shifter 32 is first, and outputs a start pulse VLCP_st0_Start_Pulse for VLCP stage-0 when the count value becomes 0. The start signal generating unit 60, the second bit of the shifter 32 is first, and when the count value becomes 0, and outputs a start pulse VLCP_st1_Start_Pulse for VLCP stage 1.

Next, the operation of the video data processing device 2 according to the second embodiment will be described. Therefore, FIG. 13 shows a timing chart for explaining the operation of the video data processing device according to the second embodiment.

Figure 13:
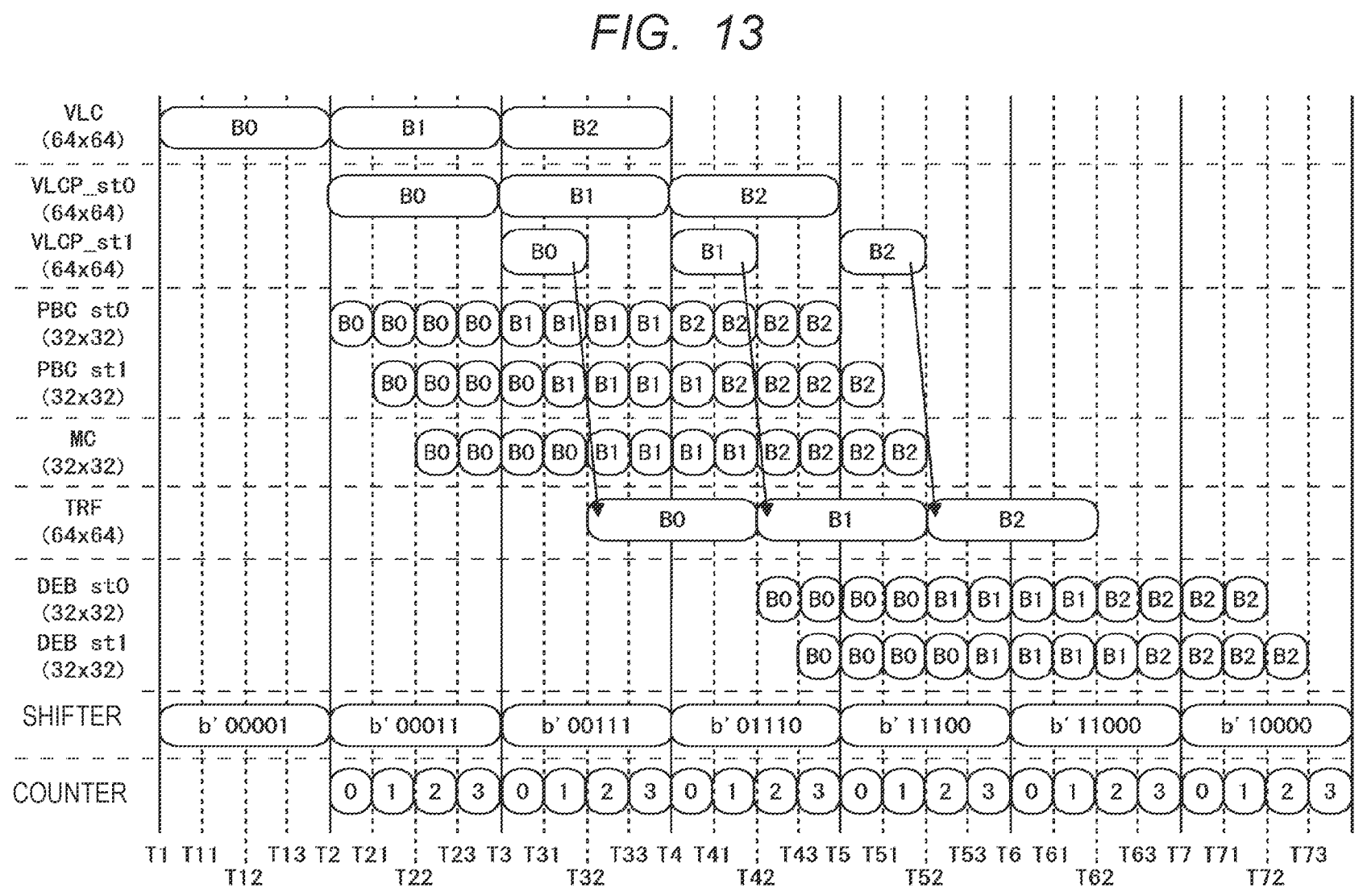

As shown in FIG. 13, in the video data processing device 2 according to the second embodiment, the first stage of the variable-length decoding parameter generation processing unit (VLCP) 42 is executed in the following cycle in which the processing of the variable-length coding decoding processing unit (VLC) 41 which is the first pipeline stage is completed (timing T2). After that, the processing of the second stage of the variable-length decoding parameter generation processing unit (VLCP) 42 is executed from the timing T3 after the processing of the first stage of the variable-length decoding parameter generation processing unit (VLCP) 42 is completed.

At this time, the parameter generation processing of the second stage of the variable-length decoding parameter generation processing unit (VLCP) 42 is designed to be completed in half the processing for the first processing unit data or in a time twice the processing for the second processing unit data. Thus, the parameter generated by the variable-length decoding parameter generation processing unit (VLCP) 42 becomes available at the timing T32 where the conversion/quantization processing unit (TRF) 14 of the processing unit-data B0 is started.

From the above description, when a plurality of processes that can be executed in different time axes are included in the processing performed in the first functional module, the functional module can be separated into a variable-length decoding parameter generation processing unit (VLCP) 42 and a variable-length decoding parameter generation processing unit (VLCP) 42 for the variable-length coding decoding processing unit (VLC) 11. Thus, in the video data processing device 2 according to the second embodiment, it is possible to reduce the circuit scale by simplifying the hardware of the first functional module.

Incidentally, the number of pipeline stages is increased by performing such separation of functional modules, but since only the number of processes to be processed in parallel is increased, an increase in the processing time of the entire pipeline is suppressed.

Although the invention made by the inventor has been specifically described based on the embodiment, the present invention is not limited to the embodiment already described, and it is needless to say that various modifications can be made without departing from the gist thereof.

What is claimed is:

1. A video data processing device comprising:
at least one first functional module for performing a first processing preset for each first processing unit of data obtained by dividing one screen of a video into rectangular region of a preset size; and
at least one second functional module for performing a second processing preset for each second processing unit of data obtained by dividing the one screen of the video into rectangular regions each having an area smaller than an area of the rectangular regions of the first processing unit of data; and
a control unit for controlling an execution order of pipeline processing on the first processing unit of data by controlling a timing at which the at least one first functional module and the at least one second functional module operate in a pipeline, the pipeline including the at least one first functional module and the at least one second functional module,
wherein the control unit instructs a functional module to start operation based on completion of processing by an upstream module in the pipeline such that:
for a first downstream second functional module of the at least one second functional module that is arranged downstream of a first upstream first functional module of the at least one first functional module in the pipeline, the control unit instructs the first downstream second functional module to start operation in response to completion of processing on one first processing unit of data by the first upstream first functional module;
for a second downstream second functional module of the at least one second functional module that is arranged downstream of a first upstream second functional module of the at least one second functional module in the pipeline, the control unit instructs the down second downstream second functional module to start operation in response to completion of processing on one second processing unit of data by the first upstream second functional module;
for a first downstream first functional module of the at least one first functional module arranged downstream of a second upstream first functional module of the at least one first functional module in the pipeline, the control unit instructs the first downstream first functional module to start operation in response to completion of processing on one first processing unit of data by the second upstream first functional module; and
for a second downstream first functional module of the at least one first functional module arranged downstream of a second upstream second functional module of the at least one second functional module in the pipeline, the control unit instructs the second downstream first functional module to start operation in response to completion, by the second upstream second functional module, of processing on second processing unit of data having a total data amount corresponding to a data amount of one first processing unit of data, and wherein the control unit includes:
a state transition machine that receives a first end signal notifying that processing in the first functional module has ended and a second end signal notifying that processing in the second functional module has ended, and changes an output value according to a combination of the received first end signal and the received second end signal; and
a start signal generation circuit that, when the output value of the state transition machine matches a start value predetermined for each functional module, transmits a start pulse instructing the functional module whose start value matches to start operation.

2. The video data processing device according to claim 1, wherein the at least one first functional module has a first image processing buffer having a storage capacity corresponding to a size of the first processing unit of data, and
wherein the at least one second functional module has a second image processing buffer having a storage capacity corresponding to a size of the second processing unit of data.

3. The video data processing device according to claim 1, wherein the at least one first functional module treats data defined as having 64 pixels in each of a vertical direction and a horizontal direction as a maximum size of the first processing unit of data, and
wherein the second functional module treats data defined as having 32 pixels in each of the vertical direction and the horizontal direction as a maximum size of the first processing unit of data.

4. The video data processing device according to claim 1, wherein at least one of the at least one first functional module and the at least one second functional module is configured such that one functional module performs processing across a plurality of pipeline stages,
the control unit treats the pipeline stage as one functional module.

5. The video data processing unit according to claim 1, wherein the second processing unit of data has a data amount corresponding to a screen area size that is $\frac{1}{2}^{2n}$ of a screen area size of the first unit processing data.

6. A video data processing device comprising:
at least one first functional module for performing a first processing preset for each first processing unit of data obtained by dividing one screen of a video into rectangular region of a preset size;
at least one second functional module for performing a second processing preset for each second processing unit of data obtained by dividing the one screen of the video into rectangular regions each having an area smaller than an area of the rectangular regions of the first processing unit of data; and
a control unit for controlling an execution order of pipeline processing on the first processing unit of data by controlling a timing at which the at least one first functional module and the at least one second functional module operate in a pipeline, the pipeline including the at least one first functional module and the at least one second functional module, wherein the control unit instructs a functional module to start operation based on completion of processing by an upstream module in the pipeline such that:

for a first downstream second functional module of the at least one second functional module that is arranged downstream of a first upstream first functional module of the at least one first functional module in the pipeline, the control unit instructs the first downstream second functional module to start operation in response to completion of processing on one first processing unit of data by the first upstream first functional module;

for a second downstream second functional module of the at least one second functional module that is arranged downstream of a first upstream second functional module of the at least one second functional module in the pipeline, the control unit instructs the down second downstream second functional module to start operation in response to completion of processing on one second processing unit of data by the first upstream second functional module;

for a first downstream first functional module of the at least one first functional module arranged downstream of a second upstream first functional module of the at least one first functional module in the pipeline, the control unit instructs the first downstream first functional module to start operation in response to completion of processing on one first processing unit of data by the second upstream first functional module; and for a second downstream first functional module of the at least one first functional module arranged downstream of a second upstream second functional module of the at least one second functional module in the pipeline, the control unit instructs the second downstream first functional module to start operation in response to completion, by the second upstream second functional module, of processing on second processing unit of data having a total data amount corresponding to a data amount of one first processing unit of data, wherein the at least one first functional module includes at least one of:

a variable-length coding and decoding processing unit that, during encoding, assigns codes of a bit stream supplied from an external bus and outputs the assigned codes to an internal bus;

a variable-length decoding parameter generation processing unit that, during decoding, outputs parameters obtained as a result of code analysis of the bit stream; and a conversion and quantization processing unit that performs quantization processing of the bit stream, and wherein the at least one second functional module includes at least one of:

a picture buffer controller that reads at least a reference image from the external bus and outputs the reference image to the internal bus;

a motion compensation processing unit that predicts motion of a video based on the bit stream supplied from the internal bus and the reference image; and a deblocking filter processing unit that performs filtering processing to reduce blocking noise for the bit stream supplied from the internal bus and outputs a result to the external bus.

7. A video data processing method in a video data processing device having:

at least one first functional module for performing a first processing preset for each first processing unit of data obtained by dividing one screen of a video into rectangular region of a preset size;

at least one second functional module for performing a second processing preset for each second processing unit of data obtained by dividing the one screen of the video into rectangular regions each having an area smaller than an area of the rectangular regions of the first processing unit of data; and a control unit for controlling an execution order of pipeline processing on the first processing unit of data by controlling a timing at which the at least one first functional module and the at least one second functional module operate in a pipeline, the pipeline including the at least one first functional module and the at least one second functional module, the video data processing method comprising:

for a first downstream second functional module of the at least one second functional module that is arranged downstream of a first upstream first functional module of the at least one first functional module in the pipeline, instructing, by the control unit, the first downstream second functional module to start operation in response to completion of processing on one first processing unit of data by the first upstream first functional module;

for a second downstream second functional module of the at least one second functional module that is arranged downstream of a first upstream second functional module of the at least one second functional module in the pipeline, instructing, by the control unit, the second downstream second functional module to start operation in response to completion of processing on one second processing unit of data by the first upstream second functional module;

for a first downstream first functional module of the at least one first functional module that is arranged downstream of a second upstream first functional module of the at least one first functional module in the pipeline, instructing, by the control unit, the first downstream first functional module to start operation in response to completion of processing on one first processing unit of data by the second upstream first functional module; and for a second downstream first functional module of the at least one first functional module that is arranged downstream of a second upstream second functional module of the at least one second functional module in the pipeline, instructing, by the control unit, the second downstream first functional module to start operation in response to completion of processing on second processing unit data having a total data amount corresponding to a data amount of one first processing unit of data by the second upstream second functional module, and wherein the video data processing method further comprises:

receiving, by a state transition machine of the control unit, a first end signal indicating that processing in a first functional module of the at least one first functional modules has ended and a second end signal indicating that processing in a second functional module of the at least one second functional modules has ended;

changing, by the state transition machine, an output value according to a combination of the received first end signal and the received second end signal; and when the output value of the state transition machine matches a start value predetermined for each functional module, transmitting, by a start signal generation circuit of the control unit, a start pulse that instructs a functional module corresponding to the matched start value to start operation.

* * * * *